Figure 3:
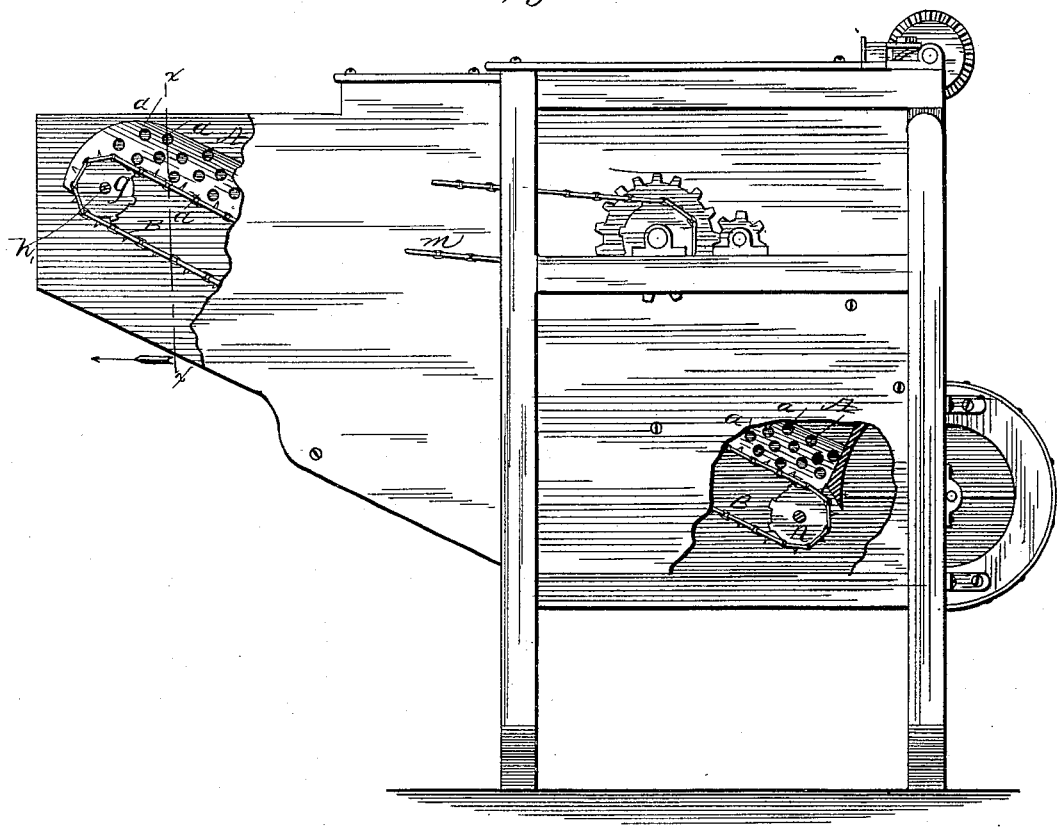

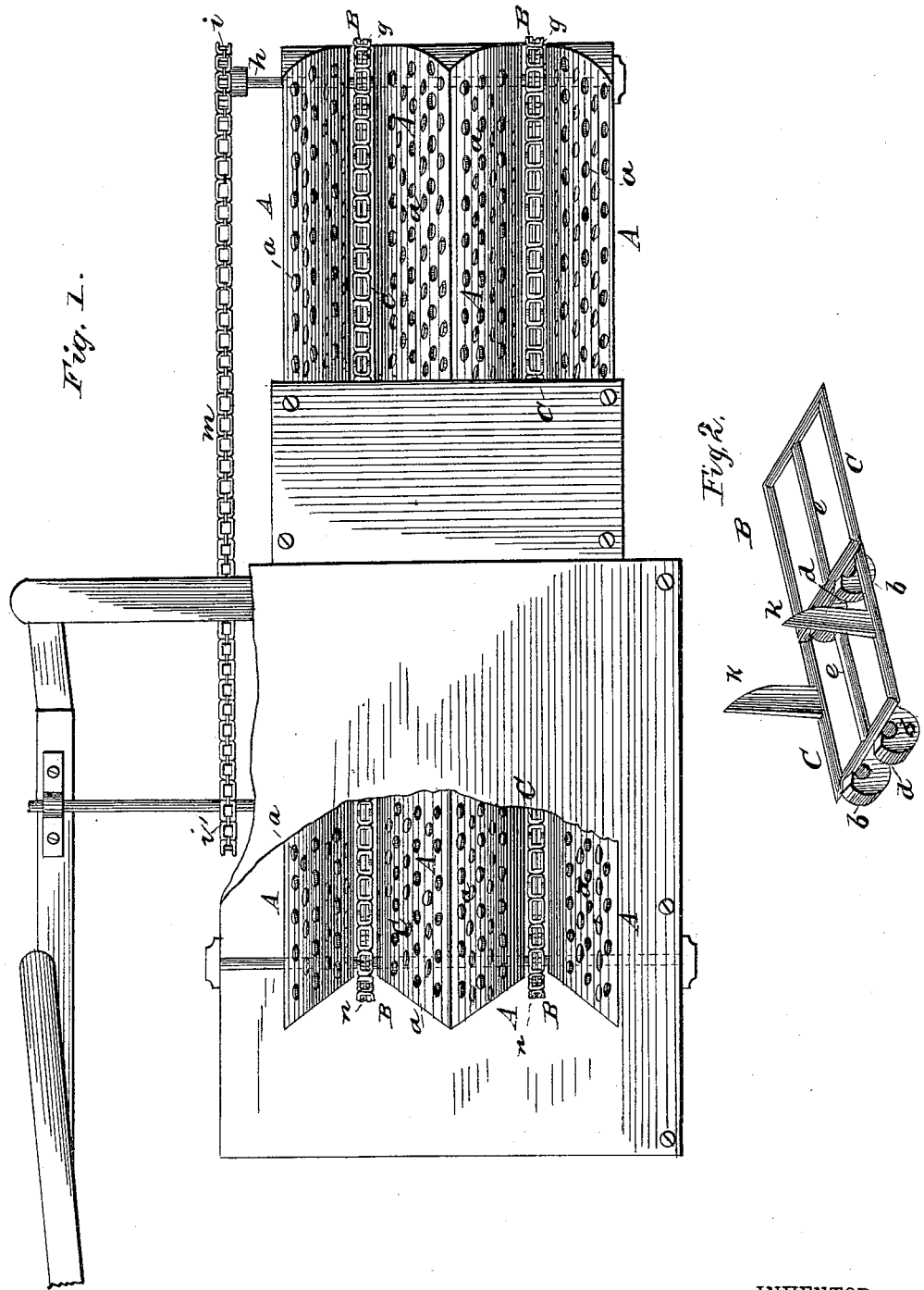

(No Model.) 2 Sheets—Sheet 2.

H. PACKER.
CORN SHELLER.

No. 263,427. Patented Aug. 29, 1882.

WITNESSES: INVENTOR.
Fred. G. Dieterich Harvey Packer
Charles H. Baker per Manahan & Ward, ATTORNEYS.

UNITED STATES PATENT OFFICE.

HARVEY PACKER, OF ROCK FALLS, ILLINOIS.

CORN-SHELLER.

SPECIFICATION forming part of Letters Patent No. 263,427, dated August 29, 1882.

Application filed May 9, 1882. (No model.)

*To all whom it may concern:*

Be it known that I, HARVEY PACKER, a citizen of the United States, residing at Rock Falls, in the county of Whiteside and State of Illinois, have invented certain new and useful Improvements in Corn-Shellers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to certain improvements in the separating devices of corn-shellers, being the construction and employment of certain novel mechanism for separating the shelled corn from the cobs and silks, and being further improvements on the corn-sheller for which Letters Patent were granted me by the United States on July 23, 1878, No. 206,258, and on October 18, 1881, No. 248,497.

Heretofore the mode of separating and cleaning the shelled corn was by the use of a shaking or oscillating screen, through which the corn sifted and over which it was intended that the husks, silks, and cobs should pass. In the process of shelling small pieces of cob are broken off, and the holes or interstices in the screen were of necessity made sufficiently small to prevent the passage of such fragments of cob. A difficulty continually met with in the devices last named was this: Frequently the corn, or part of it, was damp. Intermixed with all ear corn are small pliable husks and corn-silk. When damp, both the husks and silk have a tendency to cling or adhere to an angular or rounded surface. As the shelled corn dropped down through the holes in the sieve it would carry with it more or less of such silk and small husks, which, before they had time to pass through, being struck by the wind-blast below the sieve at their lower ends, and having their upper ends carried in the same direction as the blast beyond the holes by the moving corn on the upper side of the sieve, would become broken or wrapped against the edge of such holes, with part protruding like a streamer below the hole and part above. This, after a few repetitions, would so fill the holes that the corn could not pass through the same, but would run over the edge of the sieve. It is obvious that the shaking of the sieve could not dislodge these substances, and that nothing but frequent scraping of the sieve could afford relief. This was but temporary, and was attended with the forcing of more or less dirt into the corn below. To remedy these defects I provide a separator composed of two different kinds of surface, one of which is movable, but has its upper and lower surfaces alternately inverted, and the other of which is stationary, but over which the corn passes in a direction different from that of the line of the blast.

I will now proceed to more specifically describe my invention, premising that, as the form and general construction of my sheller are fully shown in the patents referred to and the location and operation of my present improvements will be readily understood, I do not deem it necessary to show or describe the entire corn-sheller.

Figure 4:
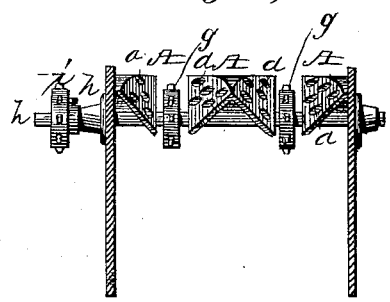

In the drawings, Figure 1 is a plan view of the part of the machine embodying my invention, the upper and front portion of the sheller being removed. Fig. 2 is a detached view of the separating-chain. Fig. 3 is a sectional side elevation of my invention in a line parallel with and adjacent to the side of the carrying-chain B. Fig. 4 is a cross-section of such separating devices.

A A are stationary planes, placed so as to slope toward the endless carrying-chain B, and set to also incline toward and below the shelling devices. The planes A A and chain B constitute my separating devices, there being two of such planes to each chain, and as many chains can be used as may be desired. I use two chains and four planes. The lower end of my separator is placed under the shelling devices, so that the shelled corn, the cobs, and everything which passes through the shelling-wheels are precipitated upon the separator. The latter is made of such length and its outer end raised to such height as may be desired.

The planes A have two functions: first, that of directing the material discharged from the shelling devices to and upon the carrying-chain B; and, second, by reason of their two slopes and their perforations $a$, which are about one-half inch in diameter, the corn passing over such planes is, by its own gravity, in part sifted from the cobs and other refuse and falls upon the incline plane beneath. In the first-named function of the planes A the perforations $a$ are not involved; in the second such perforations are essential, so that such planes can be used either with or without the perforations $a$, or with any number thereof, located as may be desired. For ordinary purposes the chain B, as hereinafter described, will be found to be a sufficient separator in itself, and that the use of the perforations $a$ will be merely supplemental.

The carrying-chain B is constructed of links C, lying in the same plane, and joined together by hooks $b$ on each link, having the slot or recess $d$ between them. Each link C is formed with an open center, except that longitudinally through the center of each link is placed the bar $e$. The link C is made sufficiently open to give ready passage to the shelled corn, while the bar $e$ prevents the passage of the fragments of cobs and of heavy dirt, such as the blast could not expel without being so strong as to blow the corn out at the end of the separator. By reason of the bar $e$ passing into the slot $d$ the links C readily fold about the carrying-pulleys when the chain B passes around the carrying-pulleys or sprocket-wheels. The bar $e$ may be placed transversely; but I think the direction shown is preferable, as it less impedes the passage of the shelled corn. And the links C may be used without a cross-bar, if made sufficiently small; but the operation would be less satisfactory.

The chain B is placed between the converging planes A A, as shown, and is operated by a sprocket-pulley, $g$, affixed to an axle, $h$, on the outer end of which is attached another sprocket-pulley, $i$, which is driven by a sprocket-chain, $m$, from a sprocket-wheel, $i'$, on the outer end of the axle of one of the shelling-wheels, or from any other suitable point. On occasional links of the chain B are formed the short posts or outward spurs $k\ k$, which prevent the cobs and other refuse from slipping downward on the chain B or lodging in the angle formed by the mutually-approaching planes A. The lower end of the chain B is carried on a sprocket-pulley, $n$.

The operation of my invention is as follows: The shelled corn, the cobs, and other refuse are thrown from the shelling devices upon the separating devices a short distance from the lower end of the latter. As the combined mass slides down toward the carrying-chain B much of the shelled corn falls through the perforations $a$. When such mass reaches the chain B the remaining shelled corn readily falls through such chain, and, the bar $e$ preventing the cobs and heavy dirt from falling through, the latter are carried up and discharged at the top of the chain. The corn which passes through the chain B falls upon the usual closed inclined back and runs down into a transverse discharge-spout, which discharges the shelled corn at one side of the machine.

The usual fan is located under and at the lower end of the separating devices, so as to send a blast of air under the planes A and up through the perforations $a$ and the openings in the links C. Any silks or pieces of husks which may drop through such perforations or links are at once expelled by such blast.

The advantage of my invention is fourfold.

First. The corn, in moving over the perforations $a$, does not move in the line of the air-blast, and does not therefore tend, as heretofore, to attach the wet silks and husks to the walls of such perforations.

Second. Any silks or husks which may cling to the chain B are, after the chain passes the sprocket-pulley $g$, presented to the air-blast in a reversed position, and thereby at once blown off.

Third. The shelled grain is delivered directly and with force from its shelling-wheels upon the separating-surface without the intervention of a cob-rake. The corn is discharged from the shelling-wheels with force sufficient to wear away wood, and effectually dislodges from the separating-surface any adhering silks or husks.

Fourth. As the chain B, by means of the spurs $k\ k$, drags the cobs upward, the latter, extending over the perforations $a$, act as a sweeper of the planes A, thus again preventing any adherence or accumulation on such planes as would obstruct the passage of the shelled corn. Thus the old trouble of clogged grain-passages is automatically avoided.

The chain B, hereinbefore described, is not claimed in this application, but is the subject-matter of another application now pending.

What I claim as my invention, and desire to secure by Letters Patent of the United States, is—

1. In a corn-sheller, the planes A, having the perforations $a$, in combination with the carrying-chain B, having open flat links, substantially as shown, and for the purpose described.

2. In a corn-sheller, the chain B, constituted of open links C, having the longitudinal bars $e$ and attached on the same plane, in combination with the planes A, substantially as shown, and for the purpose specified.

3. As a separating and elevating mechanism in a corn-sheller, the chain B, its sprocket-wheels $g$ and $n$, the planes A A, drive-chain $m$, its sprocket-pulleys $i$ and $i'$, and the axle $h$, in combination, substantially as shown.

4. In a corn-sheller, a separating device consisting of a chain, B, provided with links C, having the central bars, $e$, and slots $d$, in combination with the sprocket carrying-wheels $g$ and $n$ and perforated planes A, whereby part of such separating-surface is constantly cleansed by being inverted, substantially as shown, and for the purpose described.

5. As a means of separating the shelled corn from the cobs, silks, and other refuse, the endless chain B, constructed of open links, in combination with two planes sloping laterally toward such chain.

In testimony whereof I affix my signature in presence of two witnesses.

HARVEY PACKER.

Witnesses:
    THOMAS A. GALT,
    WALTER PLAGER.